(12) United States Patent
Lee et al.

(10) Patent No.: US 10,469,236 B2
(45) Date of Patent: Nov. 5, 2019

(54) METHOD FOR REPORTING CHANNEL STATE IN WIRELESS COMMUNICATION SYSTEM AND APPARATUS THEREFOR

(71) Applicant: LG ELECTRONICS INC., Seoul (KR)

(72) Inventors: Hyunho Lee, Seoul (KR); Suckchel Yang, Seoul (KR); Seungmin Lee, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/567,554

(22) PCT Filed: May 12, 2016

(86) PCT No.: PCT/KR2016/005001
§ 371 (c)(1),
(2) Date: Oct. 18, 2017

(87) PCT Pub. No.: WO2016/182363
PCT Pub. Date: Nov. 17, 2016

(65) Prior Publication Data
US 2018/0097603 A1     Apr. 5, 2018

Related U.S. Application Data

(60) Provisional application No. 62/160,568, filed on May 12, 2015, provisional application No. 62/221,103, filed on Sep. 21, 2015.

(51) Int. Cl.
*H04L 5/00* (2006.01)
*H04L 1/00* (2006.01)
(Continued)

(52) U.S. Cl.
CPC ......... *H04L 5/0057* (2013.01); *H04B 7/0417* (2013.01); *H04B 7/0456* (2013.01);
(Continued)

(58) Field of Classification Search
CPC .... H04B 7/0417; H04B 7/0626; H04B 7/024; H04B 7/0456; H04B 7/0643; H04B 7/065;
(Continued)

(56) References Cited

U.S. PATENT DOCUMENTS

2011/0305161 A1* 12/2011 Ekpenyong ........... H04L 1/0031
370/252
2013/0039296 A1*  2/2013 Damnjanovic ... H04W 72/1289
370/329

(Continued)

OTHER PUBLICATIONS

CATT, "CSI feedback for up to 32 CCs," 3GPP TSG RAN WG1 Meeting #80bis, R1-151350, Belgrade, Serbia, Apr. 20-24, 2015, pp. 1-4.
(Continued)

*Primary Examiner* — Khaled M Kassim
(74) *Attorney, Agent, or Firm* — Birch, Stewart, Kolasch & Birch, LLP

(57) ABSTRACT

A method by which a terminal reports an aperiodic channel state in a wireless communication system, according to one embodiment of the present invention, comprises the steps of: receiving an aperiodic channel state information (CSI) report request from a base station; and calculating the aperiodic CSI with respect to a CSI to be measured, which is indicated by the aperiodic CSI report request so as to transmit the calculated aperiodic CSI to the base station, wherein the aperiodic CSI report request indicates a report for one of a plurality of aperiodic CSI report sets, and the number of individual CSI reports included in each of the plurality of aperiodic CSI report sets can be independently set according to each aperiodic CSI report set.

8 Claims, 6 Drawing Sheets

(51) Int. Cl.

| | | |
|---|---|---|
| *H04L 1/18* | (2006.01) | |
| *H04B 7/0417* | (2017.01) | |
| *H04B 7/06* | (2006.01) | |
| *H04W 24/10* | (2009.01) | |
| *H04B 7/0456* | (2017.01) | |
| *H04W 72/04* | (2009.01) | |
| *H04B 7/024* | (2017.01) | |

(52) U.S. Cl.
CPC ......... *H04B 7/0626* (2013.01); *H04B 7/0643* (2013.01); *H04L 1/00* (2013.01); *H04L 1/18* (2013.01); *H04L 1/1887* (2013.01); *H04L 5/001* (2013.01); *H04L 5/0091* (2013.01); *H04W 24/10* (2013.01); *H04B 7/024* (2013.01); *H04B 7/065* (2013.01); *H04L 5/0023* (2013.01); *H04L 5/0035* (2013.01); *H04W 72/0413* (2013.01)

(58) Field of Classification Search
CPC ....... H04L 1/1887; H04L 5/00; H04L 5/0057; H04L 27/26; H04L 5/001; H04W 24/10; H04W 72/0413

See application file for complete search history.

(56) References Cited

U.S. PATENT DOCUMENTS

| | | |
|---|---|---|
| 2013/0142163 A1 | 6/2013 | Liu et al. |
| 2014/0092787 A1* | 4/2014 | Han ........................ H04W 4/70 370/280 |
| 2014/0126476 A1* | 5/2014 | Kang ..................... H04L 1/0026 370/328 |
| 2014/0133418 A1* | 5/2014 | Takeda ................ H04W 72/042 370/329 |
| 2015/0092698 A1* | 4/2015 | Seo ....................... H04L 1/0026 370/329 |
| 2015/0131568 A1* | 5/2015 | You ......................... H04L 5/001 370/329 |
| 2015/0245346 A1* | 8/2015 | Yokomakura ......... H04W 24/10 370/329 |
| 2016/0227530 A1* | 8/2016 | Davydov .............. H04L 5/0007 |
| 2016/0323078 A1* | 11/2016 | Takeda ................. H04J 11/0053 |
| 2016/0338041 A1* | 11/2016 | Li ........................ H04L 5/0055 |
| 2018/0083684 A1* | 3/2018 | He ....................... H04B 7/0626 |
| 2018/0092149 A1* | 3/2018 | Davydov .............. H04L 1/0026 |

OTHER PUBLICATIONS

NTT Docomo, Inc., "Views on UL control signalling enhancements for LTE CA up to 32 component carriers," 3GPP TSG RAN WG1 Meeting #80bis, R1-151969, Belgrade, Serbia, Apr. 20-24, 2015, pp. 1-6.

Sharp, "CSI reporting for CA enhancement beyond 5 carriers," 3GPP TSG RAN WG1 Meeting #80bis, R1-151706, Belgrade, Serbia, Apr. 20-24, 2015, pp. 1-4.

* cited by examiner

METHOD FOR REPORTING CHANNEL STATE IN WIRELESS COMMUNICATION SYSTEM AND APPARATUS THEREFOR

CROSS REFERENCE TO RELATED APPLICATIONS

This application is the National Phase of PCT International Application No. PCT/KR2016/005001, filed on May 12, 2016, which claims priority under 35 U.S.C. 119(e) to U.S. Provisional Application No. 62/160,568, filed on May 12, 2015 and U.S. Provisional Application No. 62/221,103, filed on Sep. 21, 2015, all of which are hereby expressly incorporated by reference into the present application.

TECHNICAL FIELD

The present invention relates to a wireless communication system, and more particularly, to a method for reporting a channel state in a wireless communication system and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to suggest a method for reporting a channel state in a wireless communication system and an operation related thereto.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In a method for an aperiodic channel state report in a wireless communication system according to one embodiment of the present invention, the method is performed by a terminal and comprises receiving an aperiodic channel state information (CSI) report request from a base station; and computing aperiodic CSI for a CSI measurement target indicated by the aperiodic CSI report request and transmitting the computed aperiodic CSI to the base station, wherein the aperiodic CSI report request indicates a report for one of a plurality of CSI aperiodic report sets, and the number of individual CSI reports included in each of the plurality of CSI aperiodic report sets is configured independently per CSI aperiodic report set.

Additionally or alternatively, the plurality of CSI aperiodic report sets may include a first CSI aperiodic report set in which component carrier (CC) or CSI process configured with a predetermined CSI reporting mode is included, and the first CSI aperiodic report set may include more CSI reports than the CSI aperiodic report sets in which CC or CSI process configured with the more CSI reporting mode is not included.

Additionally or alternatively, if the terminal is able to be configured with CCs or CSI processes that exceed a predetermined number, the number of CSI reports included in each of the plurality of CSI aperiodic report sets may be configured to exceed 5 even in the case that CCs or CSI processes less than the predetermined number are configured for the terminal.

Additionally or alternatively, if CCs or CSI processes more than the predetermined number are configured for the terminal, the number of bits indicating the aperiodic CSI report request may be configured by the base station.

Additionally or alternatively, the number of bits indicating the aperiodic CSI report request may be configured per CC or uplink (UL) subframe for which aperiodic CSI report according to the aperiodic CSI report request is performed, and a CSI aperiodic report set indicated by the aperiodic CSI report request of which bits are relatively small may be included in a CSI aperiodic report set indicated by the aperiodic CSI report request of which bits are relatively large.

Additionally or alternatively, the number of bits indicating the aperiodic CSI report request may be configured per CC or downlink (DL) subframe in which the aperiodic CSI report request is received, and the CSI aperiodic report set indicated by the aperiodic CSI report request of which bits are relatively small may be included in the CSI aperiodic report set indicated by the aperiodic CSI report request of which bits are relatively large.

A terminal configured to report an aperiodic channel state in a wireless communication system according to another embodiment of the present invention comprises a radio frequency (RF) unit; and a processor configured to control the RF unit, wherein the processor is configured to receive an aperiodic channel state information (CSI) report request from a base station, and compute aperiodic CSI for a CSI measurement target indicated by the aperiodic CSI report request and transmit the computed aperiodic CSI to the base station, and wherein the aperiodic CSI report request indicates a report for one of a plurality of CSI aperiodic report sets, and the number of individual CSI reports included in each of the plurality of CSI aperiodic report sets is configured independently per CSI aperiodic report set.

Additionally or alternatively, the plurality of CSI aperiodic report sets may include a first CSI aperiodic report set in which component carrier (CC) or CSI process configured with a predetermined CSI reporting mode is included, and the first CSI aperiodic report set may include more CSI reports than the CSI aperiodic report sets in which CC or CSI process configured with the predetermined CSI reporting mode is not included.

Additionally or alternatively, if the terminal is able to be configured with CCs or CSI processes that exceed a predetermined number, the number of CSI reports included in each of the plurality of CSI aperiodic report sets may be configured to exceed 5 even in the case that CCs or CSI processes less than the predetermined number are configured for the terminal.

Additionally or alternatively, if CCs or CSI processes more than the predetermined number are configured for the terminal, the number of bits indicating the aperiodic CSI report request may be configured by the base station.

Additionally or alternatively, the number of bits indicating the aperiodic CSI report request may be configured per CC or uplink (UL) subframe for which aperiodic CSI report according to the aperiodic CSI report request is performed, and a CSI aperiodic report set indicated by the aperiodic CSI report request of which bits are relatively small may be included in a CSI aperiodic report set indicated by the aperiodic CSI report request of which bits are relatively large.

Additionally or alternatively, the number of bits indicating the aperiodic CSI report request may be configured per CC or downlink (DL) subframe in which the aperiodic CSI report request is received, and the CSI aperiodic report set indicated by the aperiodic CSI report request of which bits are relatively small may be included in the CSI aperiodic report set indicated by the aperiodic CSI report request of which bits are relatively large.

The above technical solutions are merely some parts of the embodiments of the present invention and various embodiments into which the technical features of the present invention are incorporated can be derived and understood by persons skilled in the art from the following detailed description of the present invention.

Advantageous Effects

According to one embodiment of the present invention, a channel state may efficiently be reported in a wireless communication system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
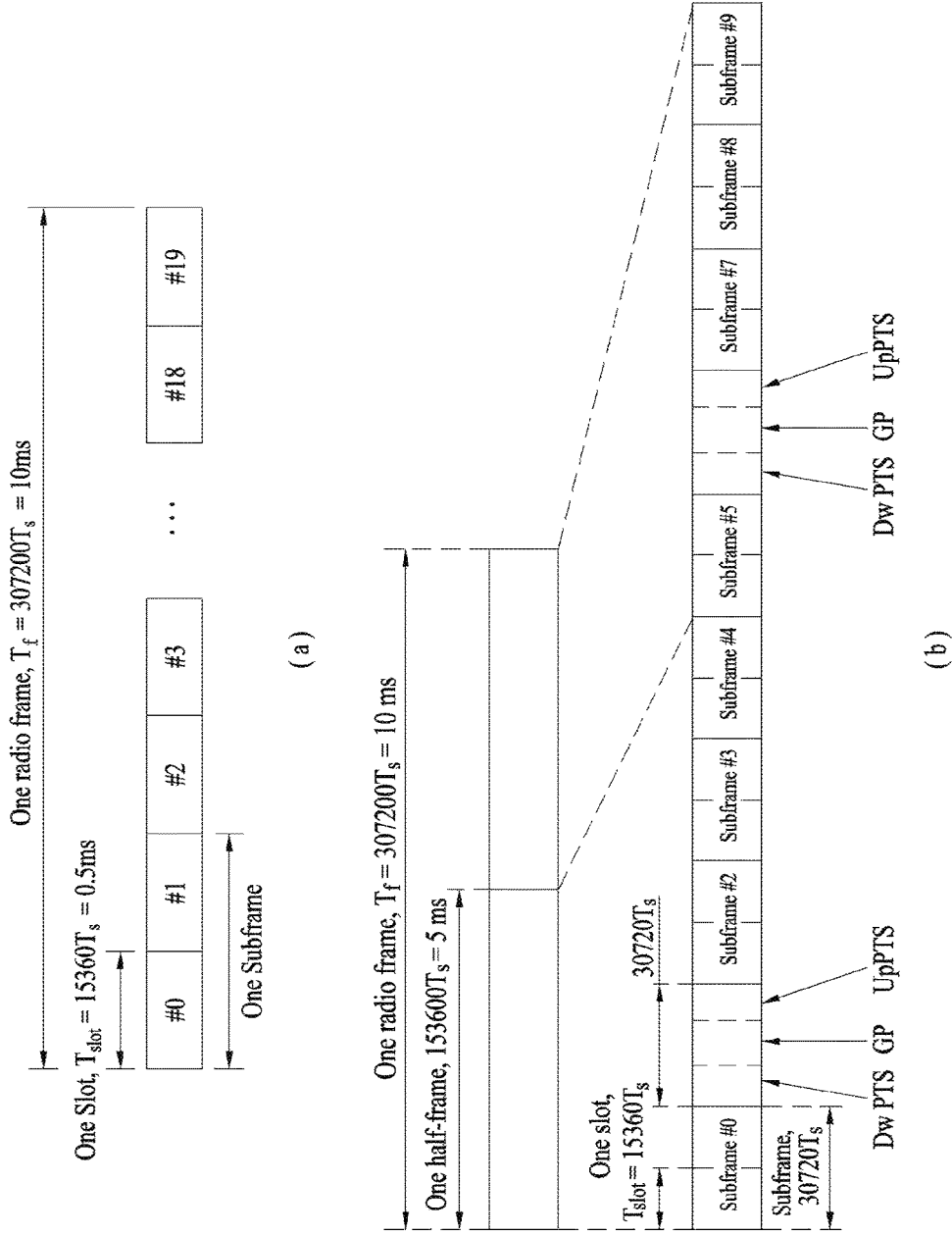
FIG. 1 is diagram illustrating an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
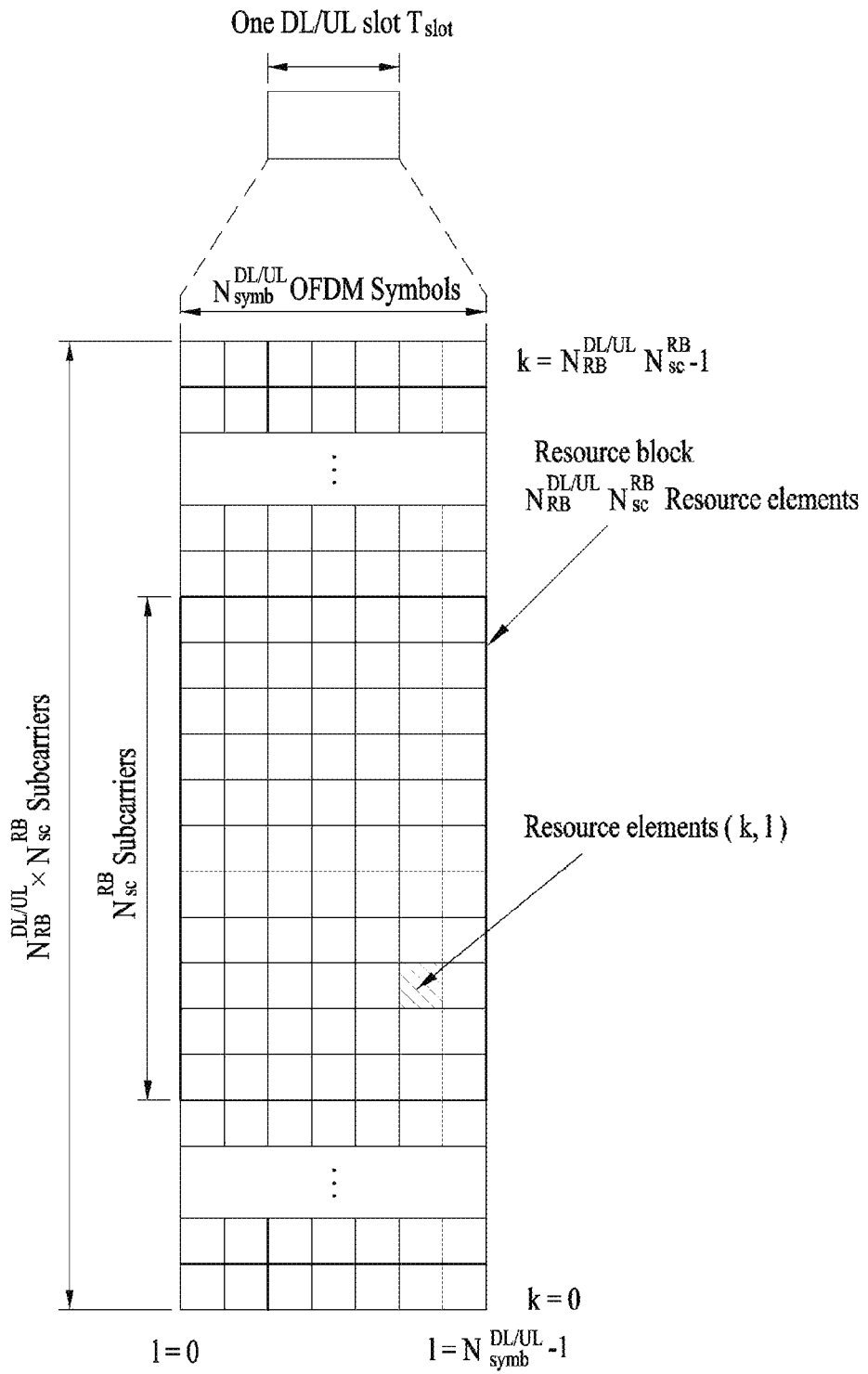
FIG. 2 is diagram illustrating an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
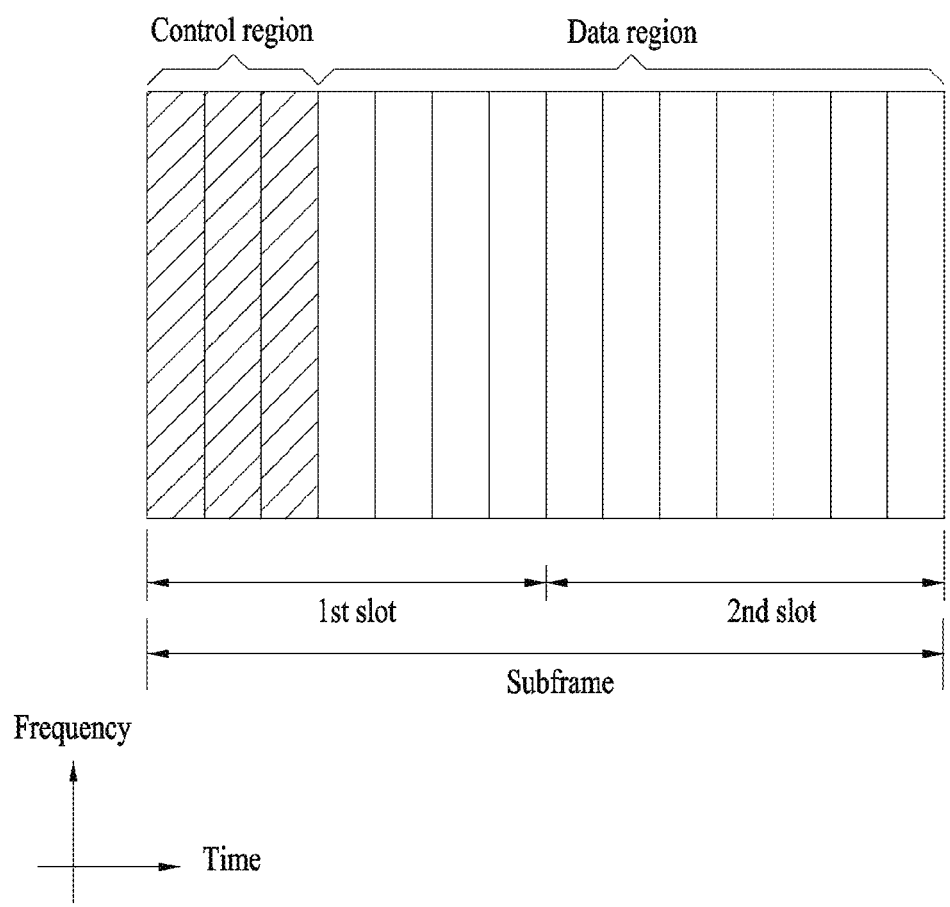
FIG. 3 is diagram illustrating an example of a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
| --- | --- | --- | --- |
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
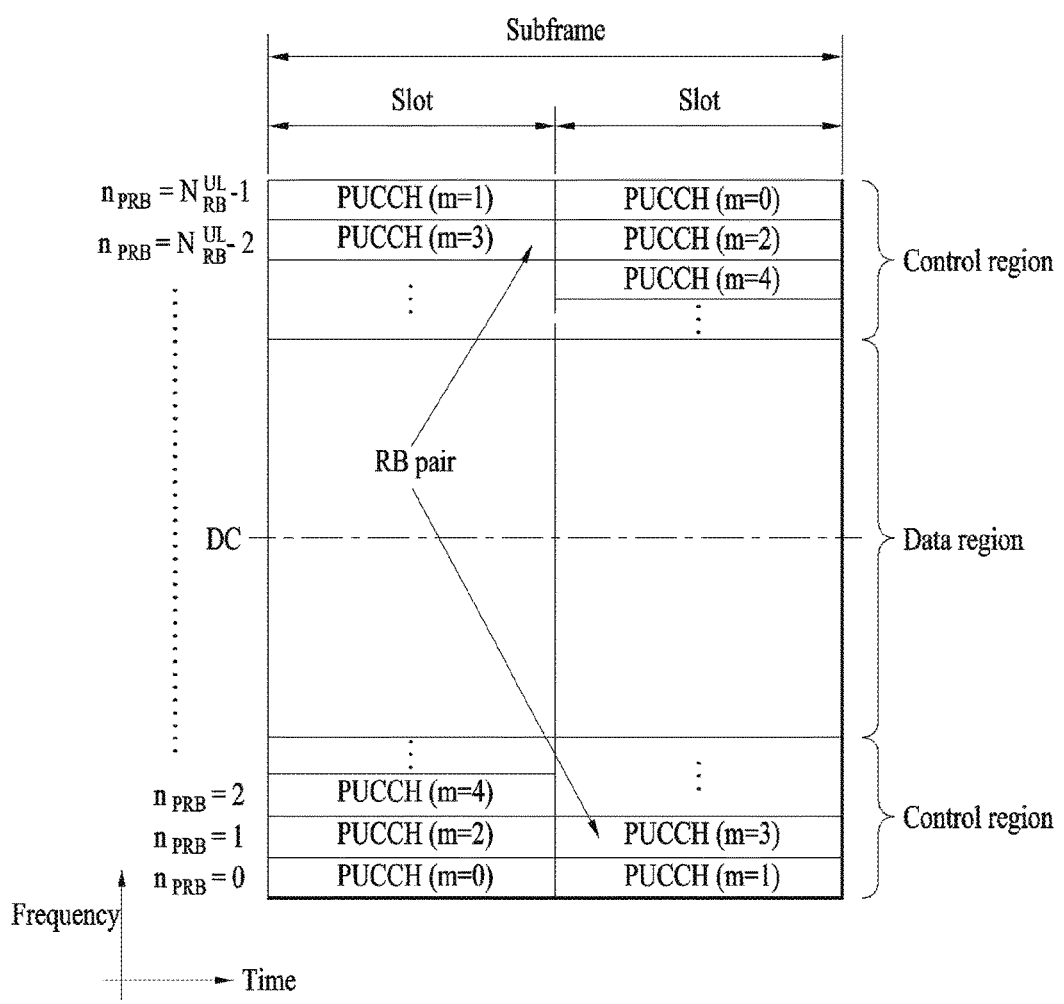
FIG. 4 is diagram illustrating an example of an uplink (UL) subframe structure used in a 3GPP LTE/LTE-A system.
Figure 5:
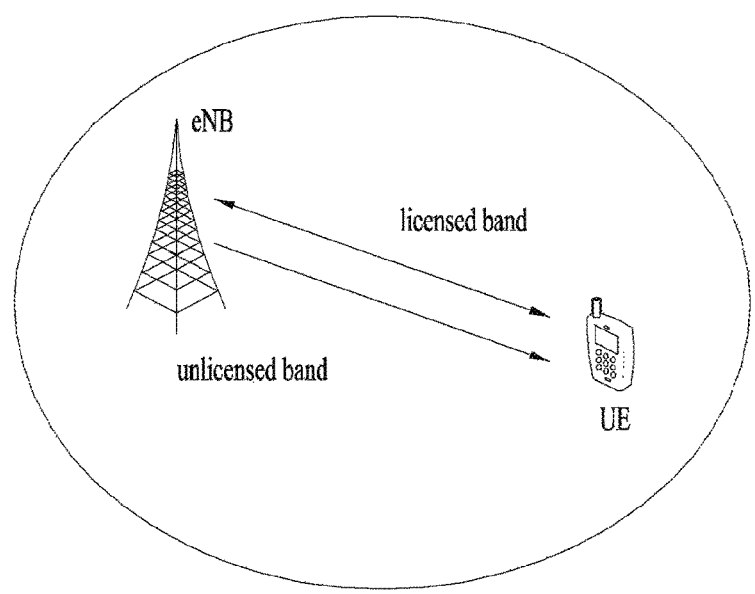
FIG. 5 is a diagram illustrating a combined system of component carriers of a licensed band and component carriers of an unlicensed band.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.
  Scheduling Request (SR): This is information used to request a UL-SCH resource and is transmitted using On-Off Keying (OOK) scheme.
  HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.
  Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI over the PUSCH after receiving a CSI transmission request control signal (a CSI request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2 RI 1st wideband CQI(4 bit) 2nd wideband CQI(4 bit) if RI > 1 N*Subband PMI(4 bit) (N is the total # of subbands) (if 8Tx Ant, N*subband W2 + wideband W1) |

TABLE 6-continued

| | PMI Feedback Type | | |
|---|---|---|---|
| | No PMI | Single PMI | Multiple PMIs |
| UE selected (Subband CQI) | Mode 2-0<br>RI (only for Open-loop SM)<br>1st wideband CQI(4 bit) + Best-M CQI(2 bit)<br>(Best-M CQI: An average CQI for M SBs selected from among N SBs)<br>Best-M index (L bit) | | Mode 2-2<br>RI<br>1st wideband CQI(4 bit) + Best-M CQI(2 bit)<br>2nd wideband CQI(4 bit) + Best-M CQI(2 bit) if RI > 1<br>Best-M index (L bit)<br>Wideband PMI(4 bit) + Best-M PMI(4 bit)<br>(if 8Tx Ant, wideband W2 + Best-M W2 + wideband W1) |
| Higher Layer-configured (Subband CQI) | Mode 3-0<br>RI (only for Open-loop SM)<br>1st wideband CQI(4 bit) + N*subbandCQI(2 bit) | Mode 3-1<br>RI<br>1st wideband CQI(4 bit) + N*subbandCQI(2 bit)<br>2nd wideband CQI(4 bit) + N*subbandCQI(2 bit) if RI > 1<br>Wideband PMI(4 bit)<br>(if 8Tx Ant, wideband W2 + wideband W1) | Mode 3-2<br>RI<br>1st wideband CQI(4 bit) + N*subbandCQI(2 bit)<br>2nd wideband CQI(4 bit) + N*subbandCQI(2 bit) if RI > 1<br>N*Subband PMI(4 bit)<br>(N is the total # of subbands)<br>(if 8Tx Ant, N*subband W2 + wideband W1) |

The transmission modes in Table 6 are selected in a higher layer, and the CQI/PMI/R1 are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI transmission over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

| | PMI feedback type | |
| --- | --- | --- |
| | No PMI | Single PMI |
| PUCCH CQI feedback type Wideband (wideband CQI) | Mode 1-0 | Mode 1-1 |
| UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.
ii) Type 1a: the UE transmits an SB CQI and a second PMI.
iii) Types 2, 2b and 2c: the UE transmits a WB-CQI/PMI.
iv) Type 2a: the UE transmits a WB PMI.
v) Type 3: the UE transmits an RI.
vi) Type 4: the UE transmits a WB CQI.
vii) Type 5: the UE transmits an RI and a WB PMI.
viii) Type 6: the UE transmits an RI and a PTI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

Currently, the LTE standard uses the 2-bit CSI request field in DCI format 0 or 4 to operate aperiodic CSI feedback when considering a carrier aggregation (CA) environment. When the UE is configured with several serving cells in the CA environment, the CSI request field is interpreted as two bits. If one of the TMs 1 through 9 is set for all CCs (Component Carriers), aperiodic CSI feedback is triggered according to the values in Table 8 below, and TM 10 for at least one of the CCs If set, aperiodic CSI feedback is triggered according to the values in Table 9 below.

TABLE 8

| A value of CSI request field | Description |
| --- | --- |
| '00' | No aperiodic CSI report is triggered |
| '01' | Aperiodic CSI report is triggered for a serving cell |
| '10' | Aperiodic CSI report is triggered for a first group of serving cells configured by a higher layer |
| '11' | Aperiodic CSI report is triggered for a second group of serving cells configured by a higher layer |

TABLE 9

| A value of CSI request field | Description |
| --- | --- |
| '00' | No aperiodic CSI report is triggered |
| '01' | Aperiodic CSI report is triggered for a CSI process group configured by a higher layer for a serving cell |
| '10' | Aperiodic CSI report is triggered for a first group of CSI processes configured by a higher layer |
| '11' | Aperiodic CSI report is triggered for a second group of CSI processes configured by a higher layer |

[LTE in Unlicensed Band (LTE-U)]

As more communication devices require greater communication capacity, a future-generation wireless communication system seeks to efficiently utilize a limited frequency band. In this context, in a cellular communication system such as an LTE system, a method for using an unlicensed band of 2.4 GHz used by the legacy WiFi system or an unlicensed band of 5 GHz newly issued in traffic offloading is under consideration. Since it is basically assumed that wireless transmission and reception is performed in an unlicensed band through contention between communication nodes, each communication node is requested to make sure that another communication node is not transmitting a signal in the unlicensed band, by performing channel sensing before transmitting a signal. This operation is called clear channel assessment (CCA). An eNB or UE of the LTE system should perform CCA to perform signal transmission in the unlicensed band (for convenience, referred to as LTE-U band). Also, when the eNB or the UE of the LTE system transmits a signal, nodes conforming to other communication standards such as Wi-Fi should not interfere with the eNB or the UE by performing CCA. For example, a Wi-Fi standard (801.11ac) regulates that a CCA threshold is −62 dBm for a non-Wi-Fi signal and −82 dBm for a Wi-Fi signal. This means that upon receipt of a non-Wi-Fi signal with power equal to or higher than −62 dBm, a station (STA) or an access point (AP) does not transmit a signal in order not to cause interference. Particularly, in the WiFi system, the STA or the AP may perform CCA if a signal of a CCA threshold or more is not detected for a 4 us or more, and may perform signal transmission.

Hereinafter, for convenience of description, a suggested method will be described based on a 3GPP LTE system. However, a range of a system to which the suggested method is applied may be applied to another system (e.g., UTRA, etc.) in addition to the 3GPP LTE system.

Figure 6:
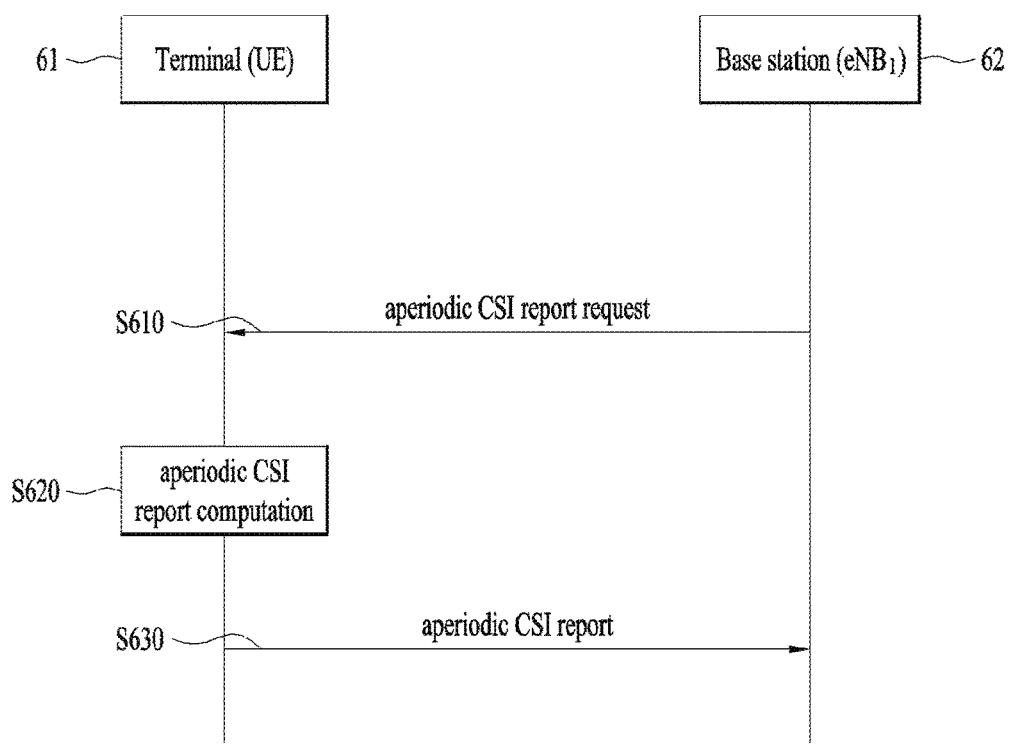
FIG. 6 is a diagram illustrating an operation according to one embodiment of the present invention.

The present specification considers a method for configuring a resource period in a cell/carrier in which an available resource period is acquired or configured aperiodically or discontinuously in the same manner as an unlicensed band where exclusive usage of a specific system is not assured, and a UE operation accompanied with the method. For example, the eNB may transmit a signal to the UE or vice versa under a carrier aggregation status of an LTE-band which is a licensed band and an unlicensed band, as shown in FIG. 6. In the following description, for convenience of description of the suggested method, it is assumed that the UE performs wireless communication in each of the licensed band and the unlicensed band through two component carriers (CC). In this case, a carrier of the licensed band may be construed as a primary component carrier (PCC or PCell) while a carrier of the unlicensed band may be construed as a secondary component carrier (SCC or SCell). However, the suggested methods of the present specification may be applied to even the status that a plurality of licensed bands and a plurality of unlicensed bands are used by a carrier aggregation scheme. Also, the suggested methods of the present invention may be applied to even the case that signal transmission and reception between an eNB and a UE is performed in the unlicensed band only. Also, the suggested methods of the present invention may be applied to the other systems as well as the 3GPP LTE system.

In order that the eNB and the UE perform communication in the LTE-U band, since the corresponding band corresponds to an unlicensed band, the corresponding band should be reserved/acquired for a specific time duration through contention with other communication (e.g., WiFi) system irrespective of the LTE. Hereinafter, the time duration reserved/acquired for communication in the LTE-U band will be referred to as a reserved resource period (RRP). Various methods may exist to acquire the RRP. Typically, a method for transmitting a specific reservation signal to allow other communication system devices such as WiFi to recognize that a corresponding radio channel is busy or continuously transmitting a reference signal (RS) and a data signal to transmit a signal of a specific power level or more without disconnection for a reserved resource period (RRP) is available. In this way, if the eNB previously determines the RRP time duration for reserving the LTE-U band, the eNB previously notifies the UE of the determined RRP time duration to allow the UE to maintain a communication transmission/reception link for the corresponding indicated RRP. As a method for notifying the UE of corresponding RRP time duration information, the eNB may indicate corresponding RRP time duration information through another CC (e.g., LTE-A band) linked in the form of carrier aggregation.

As another example of an unlicensed band operation operating in a contention based random access mode, the eNB may perform carrier sensing (CS) before performing data transmission and reception. The eNB checks whether a current channel state of the SCell is busy or idle. If it is determined that the current channel state is idle, the eNB may transmit a scheduling grant through (E)PDCCH of the PCell (i.e., cross carrier scheduling, CCS) or through PDCCH of the SCell and attempt data transmission and reception. At this time, for example, an RRP comprised of M consecutive subframes (SFs) may be configured. In this case, a value of M and usage of the M subframes may previously be notified from the eNB to the UE through higher layer signaling (using PCell) or through a physical control/data channel. A start point of the RRP may be configured periodically (or semi-statically) by higher layer signaling. Alternatively, when the RRP start point is desired to be set to SF#n, the start point of the RRP may be designated through physical layer signaling at SF#n or SF#(n-k).

In a wireless cellular communication system, one eNB controls data transmission and reception for a plurality of user equipments (UEs), and scheduling information on downlink data, for example, time/frequency information for data transmission and MCS (modulation and coding scheme) and HARQ (hybrid automatic retransmission request) related information are transmitted to a corresponding UE to allow the UE to receive data. Similarly, the eNB notifies the corresponding UE of uplink scheduling information to allow the UE to transmit uplink data. Recently, CA (carrier aggregation) for transmitting downlink data to a single UE by aggregating unit or component carrier (CC) has been introduced to support a wider bandwidth while using band identification of the related art. Particularly, in the LTE standard, self-carrier scheduling (self-CC) and cross-carrier scheduling have been considered. In the self-carrier scheduling, each cell transmits a control channel having scheduling information in a state that a plurality of CCs of different duplex modes or the same duplex mode are aggregated. In the cross-carrier scheduling, one cell transmits a control channel having scheduling information of another cell. In the current LTE standard, CA for transmitting downlink data by aggregating 5 CCs has been considered. However, CA enhancement for transmitting downlink data by aggregating 5 or more CCs (for example, 8 or 16 CCs) is recently considered to support traffic load which is rapidly increased.

The present invention suggests a method for triggering aperiodic CSI feedback in a state that a plurality of component carriers (CCs) of different duplex modes or one duplex mode are aggregated, a behavior of a UE for construing the aperiodic CSI feedback triggering, and a method for enabling the UE to transmit the corresponding feedback through an uplink channel. Also, the present invention suggests a method for reporting periodic CSI feedback.

Composition of States Corresponding to CSI Request Bit Field

In accordance with one embodiment of the present invention, the number of CSI request bits may be configured differently per CC through which aperiodic CSI report transmission is performed. In this case, sets (including CSI measurement target CCs/CSI processes) indicated by states configured when the number of CSI request bits is relatively small may be configured to correspond/conform to some of sets indicated by states configured when the number of CSI request bits is relatively large. Alternatively, a specific one of the sets indicated by states configured when the number of CSI request bits is relatively large may be configured to correspond to/conform to sets indicated by states configured when the number of CSI request bits is relatively small.

In accordance with another embodiment of the present invention, the number of CSI request bits may be configured differently per CC through which UL grant for triggering aperiodic CSI report is transmitted. In this case, sets (including CSI measurement target CCs/CSI processes) indicated by states configured when the number of CSI request bits is relatively small may be configured to correspond/conform to some of sets indicated by states configured when the number of CSI request bits is relatively large. Alternatively, a specific one of the sets indicated by states configured when the number of CSI request bits is relatively large may be configured to correspond to/conform to sets indicated by states configured when the number of CSI request bits is relatively small.

In accordance with still another embodiment of the present invention, the number of CSI request bits may be configured differently per UL subframe on which aperiodic CSI report transmission is performed. In this case, sets (including CSI measurement target CCs/CSI processes) indicated by states configured when the number of CSI request bits is relatively small may be configured to correspond/conform to some of sets indicated by states configured when the number of CSI request bits is relatively large. Alternatively, a specific one of the sets indicated by states configured when the number of CSI request bits is relatively large may be configured to correspond to/conform to sets indicated by states configured when the number of CSI request bits is relatively small.

In accordance with further still another embodiment of the present invention, the number of CSI request bits may be configured differently per DL subframe on which UL grant for triggering aperiodic CSI report is transmitted. In this case, sets (including CSI measurement target CCs/CSI processes) indicated by states configured when the number of CSI request bits is relatively small may be configured to correspond/conform to some of sets indicated by states configured when the number of CSI request bits is relatively large. Alternatively, a specific one of the sets indicated by states configured when the number of CSI request bits is relatively large may be configured to correspond to/conform to the sets indicated by states configured when the number of CSI request bits is relatively small.

In accordance with further still another embodiment of the present invention, the number of CSI request bits may be configured differently depending on DCI format for triggering aperiodic CSI report transmission. In this case, sets (including CSI measurement target CCs/CSI processes) indicated by states configured when the number of CSI request bits is relatively small may be configured to correspond/conform to some of sets indicated by states configured when the number of CSI request bits is relatively large. Alternatively, a specific one of the sets indicated by states configured when the number of CSI request bits is relatively large may be configured to correspond to/conform to the sets indicated by states configured when the number of CSI request bits is relatively small.

Configurable CSI Request Bit Size

In accordance with further still another embodiment of the present invention, when the number of cells constituting CA or the number of CSI processes configured for the UE is a specific value (within a specific range) or exceeds the specific value, the eNB may directly configure the number (e.g., 2, 3, 4, etc.) of aperiodic CSI request bits (included in a control channel intended for UL grant).

The Number of CSI Reports Per Trigger Set

In accordance with further still another embodiment of the present invention, when the number of cells constituting CA or the number of CSI processes configured for the UE is a specific value (within a specific range) or exceeds the specific value, the eNB may directly configure the number of CSI reports (e.g., the number of CCs/CSI processes linked to a specific triggering set) that may be included in a triggering set indicated by a specific state of a CSI request bit.

In accordance with further still another embodiment of the present invention, the number of CSI reports within a triggering set in which CCs/CSI processes for which a specific CSI reporting mode is configured is included may be configured to be greater than the number of CSI reports within a triggering set in which CCs/CSI processes for which a specific CSI reporting mode is configured is not included. In this case, the specific CSI reporting mode may be a mode related to wideband report, for example, CSI reporting mode 1-0, 1-1, or 1-2.

For example, the number of CSI reports within a triggering set #1 in which a cell for which a wideband only mode is configured is included may be configured to be greater than the number of CSI reports within a triggering set #2 in which only a cell for which a legacy mode is configured is included. At this time, the following assumptions may be considered.

Assumption 1: it is assumed that the number of CSI bits in the wideband only mode is W, the number of (maximum) CSI bits in the legacy mode is L (basically, W<L), and the number of (maximum) PMIs/CQIs in the legacy mode is R.

Assumption 2: it is assumed that the number of maximum CSI bits in triggering set #2 is N, the number of maximum PMIs/CQIs in set #2 is M, and the number of maximum CSI reports in triggering set #2 is V.

The followings are detailed examples of determination of the number of CSI reports within a triggering set in which CCs/CSI processes for which a specific CSI reporting mode is configured are included.

Example 1: if maximum feedback overhead per triggering set is considered as N, combination of 'a' number of wideband only modes and 'b' number of legacy modes, which satisfies a*W+b*L<=N, may be configured as triggering set #1 (i.e., a+b>V).

Example 2: if maximum PMI/CQI computation complexity per triggering set is considered as M, combination of 'c' number of wideband only modes and 'd' number of legacy modes, which satisfies c×1+d×R<=M, may be configured as triggering set #1 (i.e., c+d>V).

In accordance with further still another embodiment of the present invention, when the number of cells constituting CA or the number of CSI processes configured for the UE is a specific value (or within a specific range) or exceeds the specific value, the UE may configure the number of CSI reports, which may be included in a triggering set, to be greater than the existing number of CSI reports (e.g., up to 5 CSI reports) even in the case that the number of cells constituting CA or the number of CSI processes configured for the UE is the specific value or less.

In accordance with further still another embodiment of the present invention, in a state that one or more CCs are configured as a CC group on the basis of a specific reference (e.g., TM, CSI feedback mode, etc.) in a CA environment, if the amount (or size) of information related to a plurality of periodic CSI report(s) to be transmitted at a specific timing is greater than the amount (or size) (i.e., $N_{bth}$) of predefined (or signaled) simultaneous transmission maximum allowable information, a rule may be defined such that maximum N periodic CSI reports having relatively high priority, which satisfy a condition of "the amount (or size) of information related to N periodic CSI reports≤$N_{bth}$", may only be performed. In this case, the priority may be defined as follows.

(First alternative): the priority may be configured in the order of CC group index>PUCCH reporting type>CSI process index>CC index>CSI SF set index.

(Second alternative): the priority may be configured in the order of PUCCH reporting type>CC group index>CSI process index>CC index>CSI SF set index.

(Third alternative): the priority may be configured in the order of PUCCH reporting type>CSI process index>CC group index>CC index>CSI SF set index.

Since the examples of the above-described proposal methods may be included as one of the implementation methods of the present invention, it will be apparent that the examples may be regarded as the proposal methods. Also, although the above-described proposal methods may be implemented independently, the proposal methods may be implemented in the form of combination (or incorporation) of some of the proposal methods. A rule may be defined such that information as to application of the proposal methods (or information on the rules of the proposal methods) may be notified from the eNB to the UE through a predefined signal (e.g., physical layer signal or higher layer signal).

FIG. 6 is a diagram illustrating an operation according to one embodiment of the present invention.

FIG. 6 relates to a method for reporting an aperiodic channel state in a wireless communication system. The method may be performed by the terminal. The terminal 61 may receive an aperiodic channel state information (CSI)

report request from the base station (S610). The terminal may compute aperiodic CSI for a CSI measurement target indicated by the aperiodic CSI report request (S620) and transmit the computed aperiodic CSI to the base station (S630).

The aperiodic CSI report request may indicate a report for one of a plurality of CSI aperiodic report sets, and the number of individual CSI reports included in each of the plurality of CSI aperiodic report sets may be configured independently per CSI aperiodic report set.

The plurality of CSI aperiodic report sets may include a first CSI aperiodic report set in which component carrier (CC) or CSI process configured in a predetermined CSI reporting mode is included, and the first CSI aperiodic report set may include more CSI reports than the CSI aperiodic report sets in which CC or CSI process configured in the predetermined CSI reporting mode is not included.

If the terminal may configure CCs or CSI processes that exceed a predetermined number, the number of CSI reports included in each of the plurality of CSI aperiodic report sets may be configured to exceed 5 even in the case that CCs or CSI processes less than the predetermined number are configured for the terminal.

Also, if CCs or CSI processes more than the predetermined number are configured for the terminal, the number of bits indicating the aperiodic CSI report request may be configured by the base station.

The number of bits indicating the aperiodic CSI report request may be configured per CC or UL subframe for which aperiodic CSI report according to the aperiodic CSI report request is performed, and a CSI aperiodic report set indicated by the aperiodic CSI report request of which bits may be relatively small may be included in a CSI aperiodic report set indicated by the aperiodic CSI report request of which bits are relatively large.

Also, the number of bits indicating the aperiodic CSI report request may be configured per CC or DL subframe in which the aperiodic CSI report request is received, and the CSI aperiodic report set indicated by the aperiodic CSI report request of which bits are relatively small may be included in the CSI aperiodic report set indicated by the aperiodic CSI report request of which bits are relatively large.

Although the embodiments according to the present invention have been briefly described with reference to FIG. 6, the embodiment related to FIG. 6 may include at least a part of the aforementioned embodiment(s) alternatively or additionally.

Figure 7:
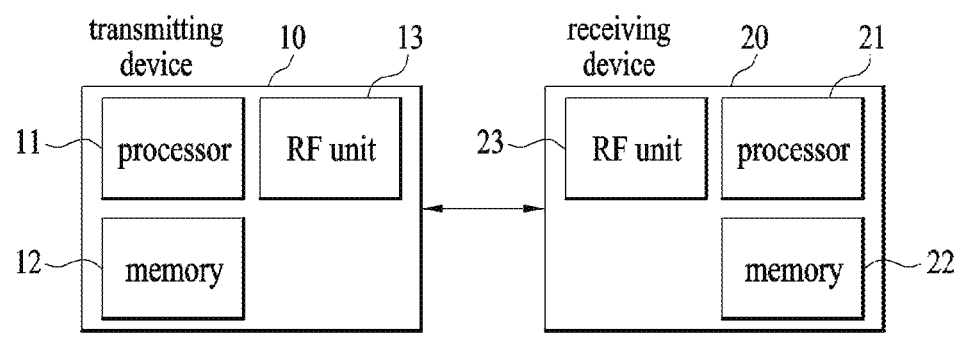
FIG. 7 is a block diagram illustrating an apparatus for implementing the embodiment(s) of the present invention.

FIG. 7 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

The invention claimed is:

1. A method for transmitting an aperiodic channel state report by a terminal in a wireless communication system, the method comprising:
receiving, from a base station, an aperiodic channel state information (CSI) report request, wherein the aperiodic CSI report request indicates a report for a set of a plurality of CSI aperiodic report sets; and
transmitting, to the base station, an aperiodic CSI based on the aperiodic CSI report request,
wherein a number of CSI reports included in a first CSI aperiodic report set among the plurality of CSI aperiodic report sets and a number of CSI reports included in a second CSI aperiodic report set among the plurality of CSI aperiodic report sets are configured independently,
wherein the first CSI aperiodic report set comprises component carrier (CC) or CSI process configured with a predetermined CSI reporting mode,
wherein the second CSI aperiodic report set does not comprise CC or CSI process configured with the predetermined CSI reporting mode,
wherein the first CSI aperiodic report set includes more CSI reports than the second CSI aperiodic report set, and
wherein, if the terminal is able to be configured with CCs or CSI processes that exceed a predetermined number, the number of CSI reports included in each of the plurality of CSI aperiodic report sets is configured to exceed 5 even in the case that CCs or CSI processes less than the predetermined number are configured for the terminal.

2. The method according to claim 1, wherein, if CCs or CSI processes more a predetermined number are configured for the terminal, the number of bits indicating the aperiodic CSI report request is configured by the base station.

3. The method according to claim 1, wherein the number of bits indicating the aperiodic CSI report request is configured per CC or uplink (UL) subframe for which aperiodic CSI report according to the aperiodic CSI report request is performed, and a CSI aperiodic report set indicated by the aperiodic CSI report request of which bits are relatively small is included in a CSI aperiodic report set indicated by the aperiodic CSI report request of which bits are relatively large.

4. The method according to claim 1, wherein the number of bits indicating the aperiodic CSI report request is configured per CC or downlink (DL) subframe in which the aperiodic CSI report request is received, and the CSI aperiodic report set indicated by the aperiodic CSI report request of which bits are relatively small is included in the CSI aperiodic report set indicated by the aperiodic CSI report request of which bits are relatively large.

5. A terminal configured to report an aperiodic channel state in a wireless communication system, the terminal comprising:
a radio frequency (RF) unit; and
a processor configured to control the RF unit,
wherein the processor is configured to:
receive, from a base station, an aperiodic channel state information (CSI) report request, wherein the aperiodic CSI report request indicates a report for a set of a plurality of CSI aperiodic report sets, and
transmit, to the base station, an aperiodic CSI based on the aperiodic CSI report request,
wherein a number of CSI reports included in a first CSI aperiodic report set among the plurality of CSI aperiodic report sets and a number of CSI reports included in a second CSI aperiodic report set among the plurality of CSI aperiodic report sets are configured independently,
wherein the first CSI aperiodic report set comprises component carrier (CC) or CSI process configured with a predetermined CSI reporting mode,
wherein the second CSI aperiodic report set does not comprise CC or CSI process configured with the predetermined CSI reporting mode, and
wherein the first CSI aperiodic report set includes more CSI reports than the second CSI aperiodic report set, and
wherein, if the terminal is able to be configured with CCs or CSI processes that exceed a predetermined number, the number of CSI reports included in each of the plurality of CSI aperiodic report sets is configured to exceed 5 even in the case that CCs or CSI processes less than the predetermined number are configured for the terminal.

6. The terminal according to claim 5, wherein, if CCs or CSI processes more than a predetermined number are configured for the terminal, the number of bits indicating the aperiodic CSI report request is configured by the base station.

7. The terminal according to claim 5, wherein the number of bits indicating the aperiodic CSI report request is configured per CC or uplink (UL) subframe for which aperiodic CSI report according to the aperiodic CSI report request is performed, and a CSI aperiodic report set indicated by the aperiodic CSI report request of which bits are relatively small is included in a CSI aperiodic report set indicated by the aperiodic CSI report request of which bits are relatively large.

8. The terminal according to claim 5, wherein the number of bits indicating the aperiodic CSI report request is configured per CC or downlink (DL) subframe in which the aperiodic CSI report request is received, and the CSI aperiodic report set indicated by the aperiodic CSI report request of which bits are relatively small is included in the CSI aperiodic report set indicated by the aperiodic CSI report request of which bits are relatively large.

* * * * *